April 8, 1958
A. L. DIETRICH
2,829,652
THRASHER CYLINDER BAR
Filed Sept. 21, 1956
FIG. 1
FIG. 2
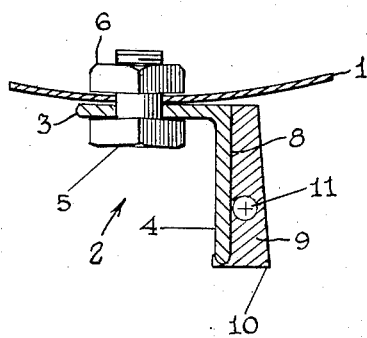
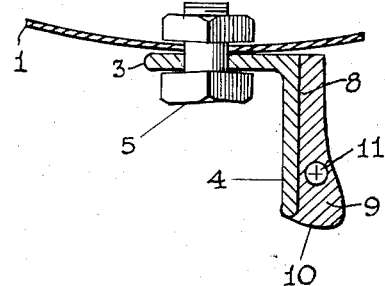
Alvin L. Dietrich
INVENTOR.
BY Alvin L. Dietrich

United States Patent Office 2,829,652
Patented Apr. 8, 1958

2,829,652

THRASHER CYLINDER BAR

Alvin L. Dietrich, Falls City, Nebr.

Application September 21, 1956, Serial No. 611,202

6 Claims. (Cl. 130—27)

This invention relates to harvesters and more particularly the invention relates to improvement in thresher beater bars used on the cylinder of present day combines.

In such threshing machines, the purpose of the beater bars is to rub and beat the grain or seeds out of the heads or pods of the harvesting crop. These beater bars are in the form of angle members with sides at right angles to each other with one side adapted to be secured to the cylinder drum or discs of the threshing machine with small bolts. The other side of the angle member extends radially outwardly from the cylinder and has a leading face extending in the direction of rotation of the cylinder. This leading face is covered with a layer of rubber that usually in the past was quite hard and rigid and lacked stretch. In such prior constructions, the rubber was easily worn, chipped and torn by incoming hard and rough rocks, weeds and the like entering the threshing chamber adjacent the cylinder and beater bars. Thereby the life of the beater bars was short and costly replacement was frequent.

My invention provides a softer covering layer of resilient, deformable elastomeric material on the leading face of the beater bar. This layer may be made from a high-grade of synthetic cold rubber. A metal element such as wire-cable is embedded in the covering layer and extends along the full length of the leading face. The metal element is located adjacent the mid-way portion of the leading face which is covered with the layer of rubber. The rubber covering is vulcanized to the radial leading face of the thresher bar. The wire-cable can be substituted with a metal rod or bar. The rubber covering is vulcanized on the wire-cable to provide a strong bond. The wire-cable gives more flexibility and holds together and reinforces the rubber facing. Further, the wire cable bridges across gaps or blisters under the rubber covering layer to keep them from growing larger. Also, the wire-cable provides extra weight in the mid-section of the rubber covering layer so that when the centrifugal force produced by the rotation of the cylinder is added to the weight of the wire-cable the wire-cable will force the rubber covering layer forwardly and outwardly and provide an extended threshing edge beyond the radial and extended portion of the metal beater bar.

This threshing edge is thus soft and pliable. The threshing edge of the invention provides a greater cushioning action with less damage to the grain harvester and also provides an automatic cylinder spacing for the incoming harvested crops that vary in thickness of their layers from time to time as they enter the threshing chamber. The threshing edge of the beater bar is forced inwardly when the threshing chamber receives a thick layer of grain. Further, the threshing edge is allowed to extend outwardly upon receiving a thin or light layer of grain in the threshing chamber whereby the spacing between the threshing edge of the cylinder and the concave non-rotating housing portion of the threshing machine is lessened making it possible to rub or beat the grain out of the heads or pods that otherwise would pass through the large opening in the threshing chamber.

This automatic adjustment provides a saving in horsepower when processing heavy grain and increases the life of the rubber threshing edge of the beater bar greatly.

Further objects and advantages of the present invention will be apparent from the description and accompanying drawings wherein:

Figure 1 is a vertical section view of a thresher bar according to my invention attached to a fragment of a cylinder of a threshing machine, the apparatus being shown in a non-rotating or motionless position; and Figure 2 is a vertical section view of the pressure bar shown in Figure 1 in its condition when the thresher is in an operating rotating state.

Referring now to the drawings, a rotatable thresher cylinder or disc 1 has a plurality of circumferentially-spaced thresher bars 2 mounted thereon. Each thresher bar 2 includes an angle member having a tangential portion 3 with holes formed therein at spaced intervals along the length of the cylinder. A support portion 4 extends perpendicularly to tangential portion 3 in a direction slightly backwardly from radially. Bolts 5 extend through the holes in tangential portion 3 of the angle member and through registering holes in the cylinder 1. A nut 6 is threadedly mounted on the bolt 5 to secure the thresher bar in position on the cylinder 1. The thresher bar 2 extends for substantially the full length of the cylinder. The support portion 4 of the thresher bar 2 has a radial leading face 8. A layer 9 of resilient, deformable, elastomeric material, such as synthetic cold rubber, is secured, as by vulcanization, to the leading face 8 over substantially the entire area thereof. The layer 9 has a threshing edge 10 at its outermost edge. A metal element such as 5/32" wire-cable 11 is embedded in the rubber layer 9 by vulcanization therein and is located 3/8" inwardly from the threshing edge 10 of the layer 9 and slightly spaced from the radial leading face 8 as seen in Figure 1, wherein the invention is illustrated in its non-rotating or motionless position.

As seen in Figure 2, where the thresher cylinder is illustrated in its operating or rotating state, the wire-cable 11 has moved slightly forwardly and outwardly a distance of about 1/8", which movement was caused by the weight of the wire-cable 11 and the additional added force from the centrifugal force resulting from the rotation of the cylinder 1. This centrifugal force moves the wire-cable 11 forwardly and outwardly, thereby forcing the rubber layer 9 forwardly and outwardly approximately 1/8" beyond the outer edge of the support portion 4 of the thresher bar 2. Thus, there is formed a soft, pliable extended threshing edge 10.

The wire-cable 11 also reinforces the rubber layer 9 to prevent its being torn and chipped by hard and rough rocks and weeds and the like passing between the beater bar and the concave thresher housing. The wire-cable 11 also bridges across any poorly vulcanized spots in the rubber layer 9 that may cause blisters in the layer. Thus, such poorly vulcanized spots are prevented from growing larger.

The rubber layer 9 may be formed of a strip 3/16" thick at its inner edge and gradually extending to 5/16" thick at the outer threshing edge. This strip is vulcanized to a precemented radial leading face 8 of pressure bar 2 by placing the elements in a properly shaped mold.

U. S. Patent No. 2,303,200 shows a threshing machine of the type in which the present invention will be used. This machine comprises a cylinder having a central shaft and a plurality of pressure bars mounted on the circumference thereof. A generally circular concave housing extends beneath and spaced from the cylinder. The housing is non-rotatably mounted on a threshing machine. A rubber-faced ledger plate is adjustably mounted on the housing. Also, two rubber strips are clamped in position on the concave housing.

In the operation of the threshing machine, the harvested grain is moved between cylinder 1 and ledger plate. The threshing bars 2, moving at relatively high speed, beat the grain kernels from the straw and force or draw the threshed grain and straw between the threshing bars and the rear edge of the ledger plate. The thresher bars and the rubber strips cooperate to beat the grain from the heads as the latter and the straw are passed through the space between the cylinder and the concave housing.

While I have shown my preferred embodiment of the invention in the drawings, I do not wish to be confined to the details shown therein, including the location of the wire-cable 11 or the dimensions of the rubber layer 9. The layer 9 may be of various thicknesses and the wire-cable 11 may be located at various positions therein. The rubber layer 9 is advantageously made of synthetic cold rubber, but it also can be made of natural rubber or any soft, resilient workable material that can be secured to the radially leading face 8 of the pressure bar 2.

Having described my invention in a preferred embodiment thereof, I wish to be limited only by the scope of the sub-joined claims.

What is claimed is:

1. A thresher beater bar for attachment to the periphery of a rotatable thresher cylinder, said thresher beater bar comprising a support member for attachment to the periphery of a rotatable thresher cylinder and having a radial leading face extending lengthwise of said thresher cylinder, a layer of resilient deformable elastomeric material of substantial thickness secured to said radial leading face of said support member and having an inner edge and an outer edge, the outer edge of the layer being substantially coextensive with the outer edge of the support member, and a metal element of substantial thickness embedded in said elastomeric layer and extending along the lengthwise dimension thereof at a position in proximity to said outer edge of said elastomeric layer, said metal element having greater density than said elastomeric layer, whereby upon rotation of said beater bar centrifugal force will move said metal element outwardly and said metal element will deform said elastomeric layer outwardly.

2. A thresher beater bar as set forth in claim 1 wherein said elastomeric layer extends at least to the outer edge of said radial leading face of said support member.

3. A thresher beater bar as set forth in claim 1 wherein said elastomeric layer has an average thickness of about ¼ inch.

4. A thresher beater bar as set forth in claim 3 wherein said metal element is positioned about ⅜ inch inwardly from the outer edge of said elastomeric layer.

5. A thresher beater bar for attachment to the periphery of a rotatable thresher cylinder, said thresher beater bar comprising an angle member having a tangential portion for attachment to the periphery of a rotatable thresher cylinder, said angle member having a support portion extending substantially perpendicularly to said tangential portion and having a lengthwise leading face with an inner edge and an outer edge, a layer of resilient deformable elastomeric material secured to said lengthwise leading face of said support portion and extending outwardly at least to said outer edge of said leading face of said support portion, said elastomeric layer extending along substantially the entire length of said leading face of said support portion, and a metal element of substantial thickness embedded in said elastomeric layer and extending substantially along the entire length thereof in proximity to the outer edge of said elastomeric layer, said metal element having greater density than said elastomeric layer, whereby upon rotation of said beater bar centrifugal force will move said metal element outwardly and said metal element will deform said elastomeric layer outwardly.

6. A threshing machine comprising a cylindrical member rotatable in a forward direction, a thresher beater bar secured to the outer surface of said cylindrical member, said beater bar including an angle member having a tangential portion attached to the outer surface of said cylindrical member and a support portion extending outwardly from said tangential portion and slightly backwardly from radially, said support portion having a lengthwise leading face with an inner edge and an outer edge extending along substantially the full length of said cylindrical member, a layer of resilient deformable elastomeric material secured to said lengthwise leading face of said support portion along substantially the full length thereof and extending outwardly to said outer edge thereof, and a metal element of substantial thickness embedded in said elastomeric layer and extending along substantially the entire length thereof in proximity to the outer edge thereof, said metal element having greater density than said elastomeric layer, whereby upon rotation of said cylindrical member and beater bar centrifugal force will move said metal element outwardly and said metal element will deform said elastomeric layer outwardly.

References Cited in the file of this patent

UNITED STATES PATENTS

| | | |
|---|---|---|
| 2,334,461 | Welty | Nov. 16, 1943 |
| 2,361,633 | Jones | Oct. 31, 1944 |
| 2,416,123 | Siemen | Feb. 18, 1947 |